US010192283B2

(12) United States Patent
Davis et al.

(10) Patent No.: US 10,192,283 B2
(45) Date of Patent: Jan. 29, 2019

(54) SYSTEM AND METHOD FOR DETERMINING CLUTTER IN AN ACQUIRED IMAGE

(71) Applicant: Cognex Corporation, Natick, MA (US)

(72) Inventors: Jason Davis, Franklin, MA (US); David J. Michael, Wayland, MA (US); Nathaniel R. Bogan, Natlick, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 14/580,153

(22) Filed: Dec. 22, 2014

(65) Prior Publication Data

US 2016/0180198 A1 Jun. 23, 2016

(51) Int. Cl.
*G06T 3/00* (2006.01)
*G06K 9/03* (2006.01)
*G06K 9/20* (2006.01)
*G06K 9/46* (2006.01)
*G06T 7/00* (2017.01)
*G06T 7/40* (2017.01)

(52) U.S. Cl.
CPC ............. *G06T 3/00* (2013.01); *G06K 9/036* (2013.01); *G06K 9/2063* (2013.01); *G06K 9/4604* (2013.01); *G06T 7/001* (2013.01); *G06T 7/40* (2013.01); *G06K 2209/015* (2013.01)

(58) Field of Classification Search
None
See application file for complete search history.

(56) References Cited

U.S. PATENT DOCUMENTS

| 5,109,425 | A | 4/1992 | Lawton |
| 6,173,070 | B1 | 1/2001 | Michael et al. |
| 6,323,776 | B1 * | 11/2001 | Jackson ................. G01B 11/00 340/679 |
| 6,476,803 | B1 | 11/2002 | Zhang et al. |
| 6,836,560 | B2 * | 12/2004 | Emery ............. G01N 21/95607 356/237.6 |

(Continued)

FOREIGN PATENT DOCUMENTS

| CN | 103559680 A | 2/2014 |
| JP | 08-086716 | 4/1996 |

(Continued)

*Primary Examiner* — Iman K Kholdebarin
(74) *Attorney, Agent, or Firm* — Loginov IP (57) ABSTRACT

This invention provides a system and method for determining the level of clutter in an image in a manner that is rapid, and that allows a scoring process to quickly determine whether an image is above or below an acceptable level of clutter—for example to determine if the underlying imaged runtime object surface is defective without need to perform a more in-depth analysis of the features of the image. The system and method employs clutter test points that are associated with regions on the image that should contain a low gradient magnitude, indicative of emptiness. This enables the runtime image to be analyzed quickly by mapping trained clutter test points at locations in the coordinate space in which lack of emptiness indicates clutter, and if detected, can rapidly indicate differences and/or defects that allow for the subject of the image to be accepted or rejected without further image analysis.

20 Claims, 8 Drawing Sheets

(56) References Cited

U.S. PATENT DOCUMENTS

| | | | |
|---|---|---|---|
| 6,920,241 B1* | 7/2005 | Dutta-Choudhury | G06T 7/001 348/125 |
| 6,941,026 B1 | 9/2005 | Nadabar et al. | |
| 7,110,602 B2 | 9/2006 | Krause | |
| 7,181,066 B1* | 2/2007 | Wagman | G06K 7/14 235/462.08 |
| 7,268,939 B1* | 9/2007 | McDowell | G02B 21/0004 359/368 |
| 7,558,419 B1* | 7/2009 | Ye | G03F 1/84 382/144 |
| 7,995,054 B2 | 8/2011 | Wheeler et al. | |
| 8,054,217 B2 | 11/2011 | Bruyere et al. | |
| 8,260,059 B2* | 9/2012 | Hofhauser | G06K 9/6206 345/419 |
| 8,269,830 B1* | 9/2012 | Delaney | G01N 21/95684 348/126 |
| 8,442,304 B2 | 5/2013 | Marrion et al. | |
| 8,447,099 B2 | 5/2013 | Wang et al. | |
| 8,488,877 B1 | 7/2013 | Owechko et al. | |
| 2002/0057838 A1* | 5/2002 | Steger | G06K 9/6203 382/197 |
| 2006/0088202 A1* | 4/2006 | Venkatachalam | G06T 5/30 382/152 |
| 2007/0161898 A1* | 7/2007 | Hao | G01S 15/8906 600/443 |
| 2008/0181487 A1* | 7/2008 | Hsu | G06K 9/3241 382/154 |
| 2008/0311551 A1* | 12/2008 | Reed | G06K 9/2063 434/356 |
| 2009/0002224 A1* | 1/2009 | Khatib | G01S 7/414 342/25 R |
| 2009/0116748 A1* | 5/2009 | Davison | G06K 9/00449 382/195 |
| 2009/0232388 A1 | 9/2009 | Minear et al. | |
| 2013/0096884 A1* | 4/2013 | Parker | G06F 17/00 702/189 |
| 2013/0163851 A1* | 6/2013 | Dalla-Torre | G06T 7/001 382/149 |
| 2013/0242354 A1* | 9/2013 | Dewancker | H04N 1/40 358/448 |
| 2013/0293532 A1 | 11/2013 | Vaddadi et al. | |
| 2013/0308875 A1* | 11/2013 | Jacobson | G06K 9/3216 382/284 |
| 2013/0336575 A1* | 12/2013 | Dalla-Torre | G06T 7/001 382/149 |
| 2014/0050387 A1* | 2/2014 | Zadeh | G06T 7/0004 382/141 |
| 2014/0078353 A1* | 3/2014 | Tezaur | G06T 5/002 348/241 |
| 2014/0086495 A1* | 3/2014 | Hao | G06K 9/00664 382/218 |
| 2014/0120319 A1 | 5/2014 | Joseph | |
| 2014/0192050 A1 | 7/2014 | Qiu et al. | |
| 2014/0337775 A1* | 11/2014 | Northrup | G06F 8/34 715/770 |
| 2015/0003723 A1 | 1/2015 | Huang et al. | |
| 2015/0006126 A1 | 1/2015 | Taguchi et al. | |

FOREIGN PATENT DOCUMENTS

| | | |
|---|---|---|
| JP | 08-189905 | 7/1996 |
| JP | 11-195121 | 7/1999 |
| JP | 2007218743 A | 8/2007 |
| JP | 2013257304 A | 12/2013 |
| WO | 1997040342 | 10/1997 |
| WO | 2010042466 A1 | 4/2010 |
| WO | 2012146253 A1 | 11/2012 |
| WO | 2015002114 A1 | 1/2015 |

* cited by examiner

SYSTEM AND METHOD FOR DETERMINING CLUTTER IN AN ACQUIRED IMAGE

FIELD OF THE INVENTION

This invention relates to machine vision systems and associated methods for alignment and inspection of objects in an imaged scene.

BACKGROUND OF THE INVENTION

Machine vision systems, also termed "vision systems" herein, are used to perform a variety of tasks in a manufacturing environment. In general, a vision system consists of one or more cameras with an image sensor (or "imager") that acquires grayscale or color images of a scene that contains an object under manufacture. Images of the object can be analyzed to provide data/information to users and associated manufacturing processes. The data produced by the image is typically analyzed and processed by the vision system in one or more vision system processors that can be purpose-built, or part of one or more software application(s) instantiated within a general purpose computer (e.g. a PC, laptop, tablet or smartphone).

Common vision system tasks include alignment and inspection. In an alignment task, vision system tools, such as the well known PatMax® system commercially available from Cognex Corporation of Natick, Mass., compares features in an image of a scene to a trained (using an actual or synthetic model) pattern, and determines the presence/absence and pose of the pattern in the imaged scene. This information can be used in subsequent inspection (or other) operations to search for defects and/or perform other operations, such as part rejection.

A particular challenge in determining alignment and quality for (e.g.) printed surface is where "clutter" is present. In this context, clutter can be defined as a proliferation of gradient features that surround a feature of interest. For example, a smudge surrounding a printed letter can be considered clutter.

SUMMARY OF THE INVENTION

This invention overcomes disadvantages of the prior art by providing a system and method for determining the level of clutter in an image in a manner that is rapid, and that allows a scoring process to quickly determine whether an image is above or below an acceptable level of clutter—for example to determine if the underlying imaged runtime object surface is defective without need to perform a more in-depth analysis of the features of the image. The system and method employs clutter test points that are associated with featureless regions on the image (for example, exhibiting a low gradient magnitude) that should be empty according to a training pattern. This enables the runtime image to be analyzed quickly using a training pattern that maps clutter test points at locations in the coordinate space in which emptiness should exist, and in which presence of features/high magnitude means that clutter may be present, and if located, can rapidly indicate differences and/or defects that allow for the subject of the image to be accepted or rejected without (free-of) further image analysis. In further embodiments, the clutter score determined according to the system and method can be combined with a traditional (e.g.) "coverage" score (for example using regular image feature probes) to achieve analysis of a runtime image.

In an illustrative embodiment, a system and method for determining clutter in an imaged scene with a vision system is provided. The system and method includes providing a runtime image of a scene and a trained pattern with a set of clutter test points that represent emptiness in the trained pattern. A runtime pose is established, including a coordinate space for the image with respect to the trained pattern. Illustratively, the clutter test points are mapped on the coordinate space for the image and a level of emptiness is determined, respectively, at the mapped clutter test points. Based upon the determined level of emptiness, an associated level of clutter is determined in at least a portion of the image. Illustratively, the determination of the level of clutter comprises generating respective clutter score values for the mapped clutter test points. The clutter score values can be summed and the system and method can generate an overall clutter score value for at least the portion of the image. The determination of the level of emptiness can comprise determining a gradient magnitude respectively at the mapped clutter test points and comparing the magnitude to a predetermined threshold, and the establishment of the pose can comprise at least one of (a) employing alignment tools in a vision system to automatically align the runtime image to the trained pattern and (b) obtaining information indicating the pose from a user input.

In another illustrative embodiment, a system and method for determining a level of clutter in at least a portion of an imaged scene with a vision system is provided. This system and method includes providing a training image with a feature of interest and a predetermined clutter threshold value relative to a level of emptiness that indicates clutter-free regions in the image. Clutter test points are established with respect to a coordinate space of the training image based upon locations in the coordinate space that represent the level of emptiness that is free-of clutter. Illustratively, the training image can include a mask that indicates which areas of the training image should be evaluated for emptiness and/or features specified by description free of reliance on pixel values. The clutter test points can be determined by presence of a gradient magnitude in regions of the training image less than a predetermined threshold value. The clutter test points can be stored with respect to the coordinate space of the trained image for use in clutter determination in a runtime image, and the clutter threshold value can be computed based upon a histogram of gradient values within the training image. The clutter threshold can be provided as an input parameter.

In another illustrative embodiment, a system and method for determining a level of clutter in a runtime candidate image based on a trained pattern using a vision system is provided. A training time clutter point generator generates an array of clutter test points relative to a coordinate space in a training image having information based upon locations in the training image that have a level of emptiness below a clutter threshold. The clutter threshold is established based upon predetermined parameters and the information in the training image. A runtime clutter determiner maps the locations of the clutter test points to the runtime candidate image based upon a runtime pose, and computes a level of emptiness at each of the locations to determine the level of clutter in at least a portion of the acquired image. Illustratively, the level of emptiness in the runtime candidate image can be based upon a determined gradient magnitude at the locations, respectively. A clutter utilizer employs the determined clutter level to perform a predetermined action with respect to a surface associated with the runtime candidate image based upon the determined level of the clutter. By way of example, the predetermined action can include at least one of part reject, issuing an alert, transmitting quality data and stopping a moving line. At least one of the predetermined parameters can be input by a user. The clutter determiner can create a clutter score at each of the locations. The clutter determiner sums the clutter score for each of the locations to generate an overall clutter score for the runtime candidate image. The information can include a feature of interest, and can further comprise an alignment tool that determines the runtime pose based upon a location of at least a portion of the feature of interest in each of the training image and the runtime candidate image.

BRIEF DESCRIPTION OF THE DRAWINGS

The invention description below refers to the accompanying drawings, of which.

DETAILED DESCRIPTION

Figure 1:
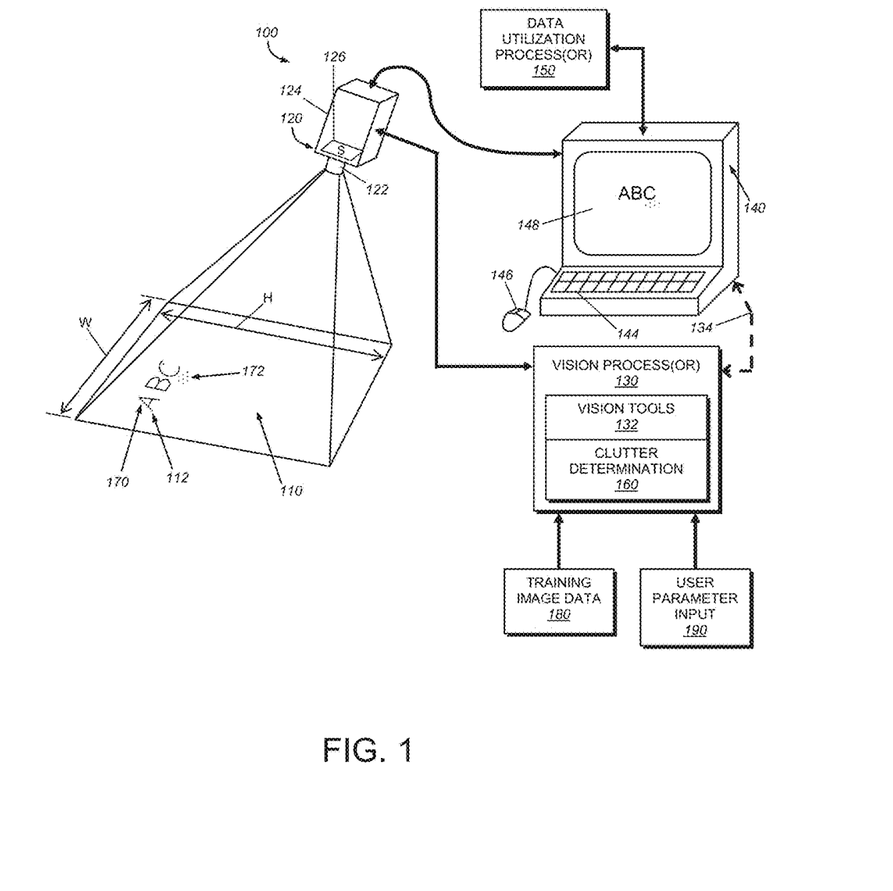
FIG. 1 is a diagram of a vision system arranged to acquire an image of a surface of an object containing exemplary text in which a smudge, representative of clutter is present.

FIG. 1 shows a machine vision system arrangement (also termed simply, "vision system") 100 for use in inspecting and/or analyzing features 112 on an object surface 110 that is imaged within the field of view (FOV) of a vision system camera assembly 120. The camera assembly 120 can be any acceptable arrangement of components and typically includes a lens assembly 122 and a camera body 124 that houses an image sensor (or "imager") 126, based upon any acceptable imaging technology, such as CCD or CMOS. The imager 126 can be arranged to acquire images in two dimensions (e.g. height H and width W) in an array of image pixels that can be adapted to sense the scene in either grayscale or color. The camera body can contain various image processing components that constitute a vision processor 130 that operates an associated vision process. The vision processor operates upon the acquired images of the scene and can employ vision system tools and processes 132 to extract information from the acquired image. This information can relate to features of interest and other items appearing within the image—for example vision system tools such as the well-known PatMax®, available from Cognex Corporation of Natick, Mass., can be used to analyze features in the image and provide information on relative pose, alignment and other details—e.g. edges, blobs, etc. While some or all of the vision system processes can be instantiated within the body 124 of the camera assembly 120. It is expressly contemplated that some or all of the processes (as indicated by dashed arrow 134) can be carried out by an interconnected (wired or wireless) computing device/processor, such as a purpose-built processor or a general purpose computer (e.g. server, PC, laptop, smartphone, tablet, etc.) 140, with appropriate user interface 142 and display 144, 146 and display 148. The interconnected computing device/processor 140 can employ the processed image data to carry out further utilization tasks (i.e. using a "utilization element(s)" or "utilizer" process(es)) 150. For example, where the vision system carries out inspection tasks, the information can be used to provide quality control information to a database or to reject defective parts on a line. The information can also be used (e.g.) in logistics applications, by reading labels and/or ID codes on objects. A variety of other utilization tasks can also be undertaken with image data and associated information.

In the illustrative embodiment, the vision process and processor includes a clutter determination process/processor 160. That operates to determine a level of clutter in an acquired image according to embodiments herein. Clutter is generally considered information in an image where, according to the trained pattern in the image, none should exist. One example of clutter is a smudge (e.g. clouded area 170) in association with a desired printed pattern 172. In general, most conventional search tools look for the presence of a trained pattern, and if found, return a result that indicates success. However, in the case of clutter or other undesired "noise" in an image of an object surface, the desired/trained pattern may exist, but the overall image still indicates a defect (due to the additional noise or clutter) that would cause a user to reject the object as defective. By way of a further example, when searching for a pattern—for example a printed "P"—the search tool may properly find the elements of the P, but ignore that a further element—the bottom-right bar indicative of a printed "R", for example, exists in the image. The bottom right bar can be considered a form of "clutter". Thus, it is both desirable and challenging to determine a level of such "clutter" in the image and form a basis for whether the imaged object surface is acceptable or unacceptable (or even properly registered by the vision system), based upon the level of such clutter.

In determining a level of clutter in the image, the system first provides training image data 180, which typically includes features of interest (e.g. printing), and can be based upon acquired images of an actual training object surface and/or synthetic image data. That is, the training image and associated training pattern can be specified by a description provided in (e.g.) a CAD model, synthetic square, etc. The term "training image" and "training pattern" should thus be taken broadly to include data sets that are specified generally free of reliance of pixel values. As also shown in FIG. 1, the system also receives various input parameters 190 from the user for both training and runtime operation as described further below.

Figure 2:
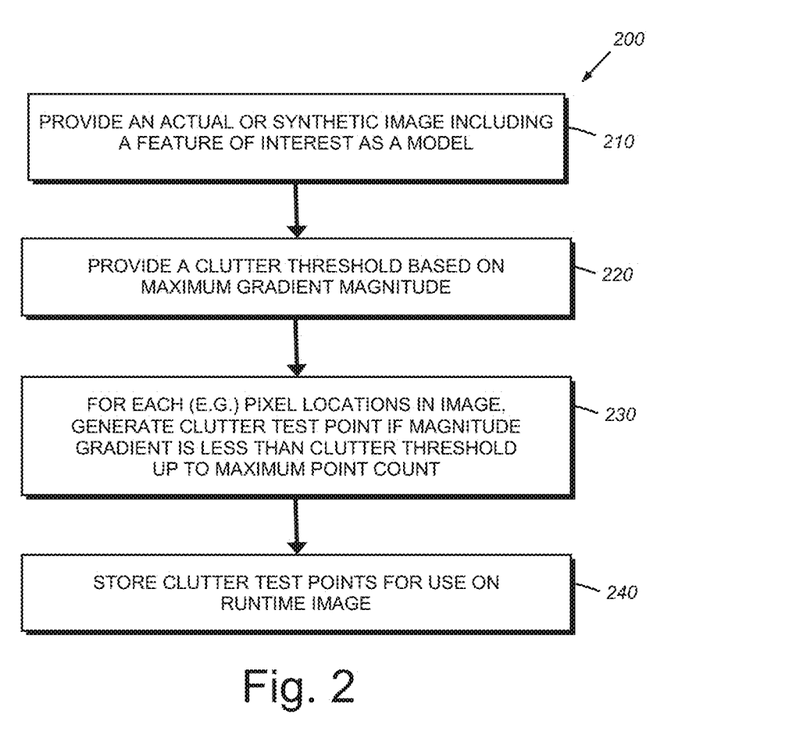
FIG. 2 is a flow diagram of a training procedure for establishing clutter test points based upon a model image for use in determining presence or absence of clutter in an acquired runtime image.

Reference is now made to FIG. 2, which shows a procedure 200 for establishing a training image that is used in a subsequent runtime clutter determination procedure described below. An actual or synthetic training image is provided to the system in step 210. The training image is arranged as a two-dimensional (2D) array of pixels, each having coordinates (x and y) and associated intensity value(s) (for example, where multiple colors/color intensities exist). Alternatively, another value, such as height in a height map can describe the pixel at given coordinates. Additionally, the training image can include at least one feature of interest—for example printing and/or graphics that defines contrasting edges and predetermined shapes. The image can be acquired from a physical model by the camera assembly (or another camera arrangement), or can be synthetically produced using predefined shapes for features of interest generated by and inserted into the training image by a user—for example a predefined circle, square, letter, etc. of a given size/scale.

In step 220, the procedure 200 provides a clutter threshold value that is based on the maximum gradient magnitude in the training image. This threshold can be provided as a user-input or system-provided parameter. The threshold can be computed in the alternative.

In step 230, the procedure 200 generates clutter test points in association with each specified location in the training image. These locations can be based upon pixel locations or can be associated with sub-pixel locations, or can generally be established with any acceptable coordinate space relative to the training image. Each of the clutter test points are established at respective locations that have a magnitude less than the clutter threshold. In other words, clutter test points (also termed "clutter probes") are applied to weak edges in an image where the measured/analyzed values for gradient magnitude (or another indicia of image features/characteristics) is below a given threshold.

By way of example, the procedure includes establishment of a sigmoid response function that is particularly adapted to clutter determination in accordance with illustrative embodiments. By way of non-limiting example, the form of the sigmoid response function can be represented by:

$$1/(1+(t/x)^{1/\sigma})$$

where an input x is provided to the function and t is a "soft" threshold. Values for x and t are in the same units, e.g. gradient magnitude. The soft threshold specifies the value at which the sigmoid's output is ½. In addition, a sigmoid's rate of transition from 0 to 1 can be controlled by a parameter typically called σ. The soft threshold t defines the center-point of this clutter response function sigmoid. The value for the soft threshold t can be defined by a default value, such as 0.01, or t can be specifically input as a different parameter value by the user. The soft threshold t is configured similarly to a noise threshold value in other vision system applications/processes (e.g. PatMax®, or RedLine™, also available from Cognex Corporation). The mechanisms and techniques used for determining and/or inputting such noise thresholds are, thus applicable using skill in the art to the specification/input of the value t to the system. Additionally, in an illustrative embodiment, the value for σ in the above sigmoid response function can be provided by the exemplary equation:

$$\sigma = \log t / -3$$

where log is a base-10 logarithm, and t expresses the threshold as a gradient magnitude between 0 and 1. This equation is highly variable in alternate implementations. The particular relationship provided, by way of non-limiting example above, provides a desirable response for the sigmoid function over the entire range of meaningful thresholds. That is, the exemplary equation for σ allows the response functions "ramp-up" to be more-gradual when the threshold is higher, but never makes the response slow enough to overly resemble a simple linear response. Notably, using the scoring sigmoid response function described above, the procedure can determine the input gradient magnitude that would produce an output of a value denoted by the parameter/variable ClutterScoreCutoff.

In general, the above described value for ClutterThreshold can be computed similarly to a noise threshold in vision system processes using, e.g. a histogram. Then, for each pixel in the fine gradient image that has a magnitude of less than ClutterThreshold, and is marked "present" (or another similar flag) in the training mask (if given), the procedure generates a clutter test point. As such, the system considers (for later runtime analysis) locations on the training image/pattern that should have a low gradient magnitude at runtime, and are thus potential locations to provide a clutter test point.

Note that regions of the image can be masked out from location of clutter test points if they are considered unimportant to the analysis of the image.

Figure 3:
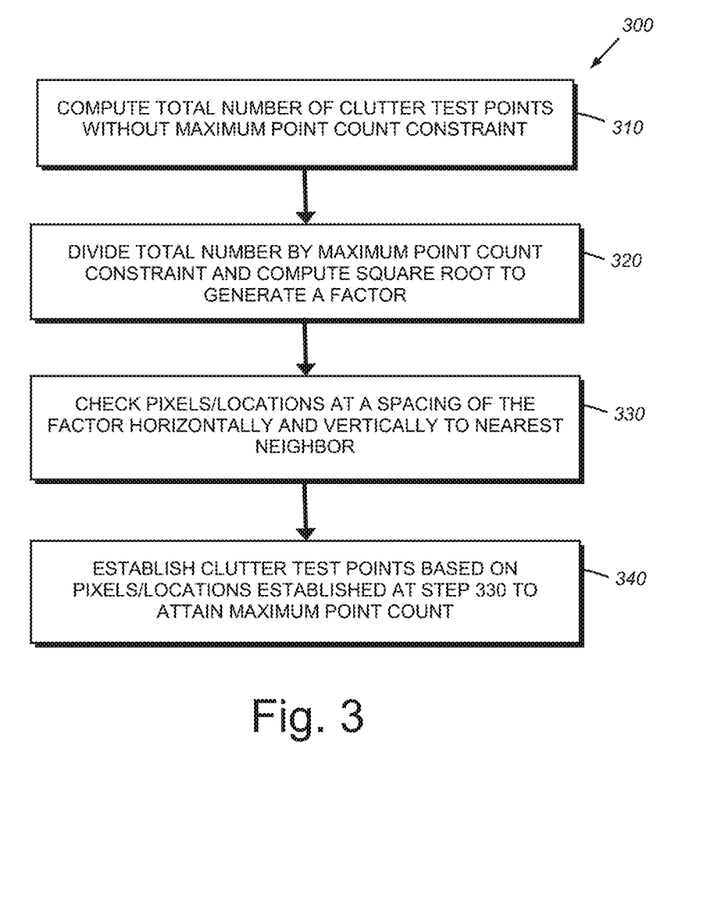
FIG. 3 is a flow diagram of a procedure for establishing values for ClutterPixelCount and TrainingPixelCount for use with the training procedure of FIG. 2.

With reference to step 230 in FIG. 2 and FIG. 3, the generation of clutter test points can be capped (according to sub-procedure 300) to a maximum clutter point count in the image according to a set value of MaxClutterPixels. By way of non-limiting example, a default value of 10,000 can be employed. As such, the total number of clutter test points that should be generated without this cap (i.e. ClutterPixelCount in step 310) is divided by the value of MaxClutterPixels in step 320. Illustratively, the square root of this value is computed. For example, where 20,000 total clutter test points should be generated and 10,000 is the maximum, then the resulting factor n becomes $(10,000/20,000)^{1/2}$, or 1.414. Thus, in step 330, the procedure 300 checks every 1.414'th pixel (or other location in the coordinate space, e.g. sub-pixel) both horizontally and vertically (rounded off, nearest neighbor), and the procedure (step 230 in FIG. 2) test only those pixels/locations for emptiness as being below the threshold (also termed "dead space" at training time—which becomes "clutter" at runtime if unexpected data is present in that location in the runtime image). This procedure 300 samples 1/nth of the overall image data. The sample will be an approximation of the value MaxClutterPixels. It should be clear that a variety of other techniques can be employed to cap the number of clutter test points in an image. Some techniques can involve omitting certain regions from the image or weighting counts in certain areas due to expected features or lack thereof. The procedure 300 then establishes the locations of clutter test points in the training image in step 340 based upon the pixels/locations provided in step 330. These are stored in a refiner in accordance with step 240 of procedure 200 (FIG. 2).

Figure 4:
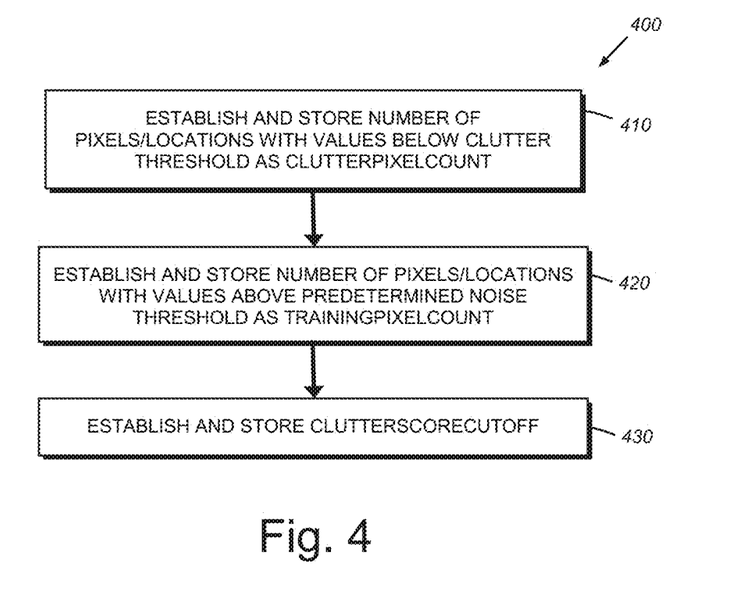
FIG. 4 is a flow diagram of a procedure for constraining a number of clutter test points to a maximum point number based upon a constraint value.

With reference also to the sub-procedure 400 of FIG. 4, the when storing clutter test points in step 240 (FIG. 2), the system, also computes (or otherwise establishes) and the number of fine training pixels/locations below the ClutterThreshold value on the secondary clutter sigmoid curve, and saves this value in the refiner as the value ClutterPixelCount in step 410. Likewise, the number of fine pixels/locations with values above the predetermined gradient magnitude threshold are stored in the refiner as TrainingPixelCount in step 420. This value can be established in a variety of ways. The value for ClutterScoreCutoff is also stored in the refiner in step 430, as described above.

Figure 5:
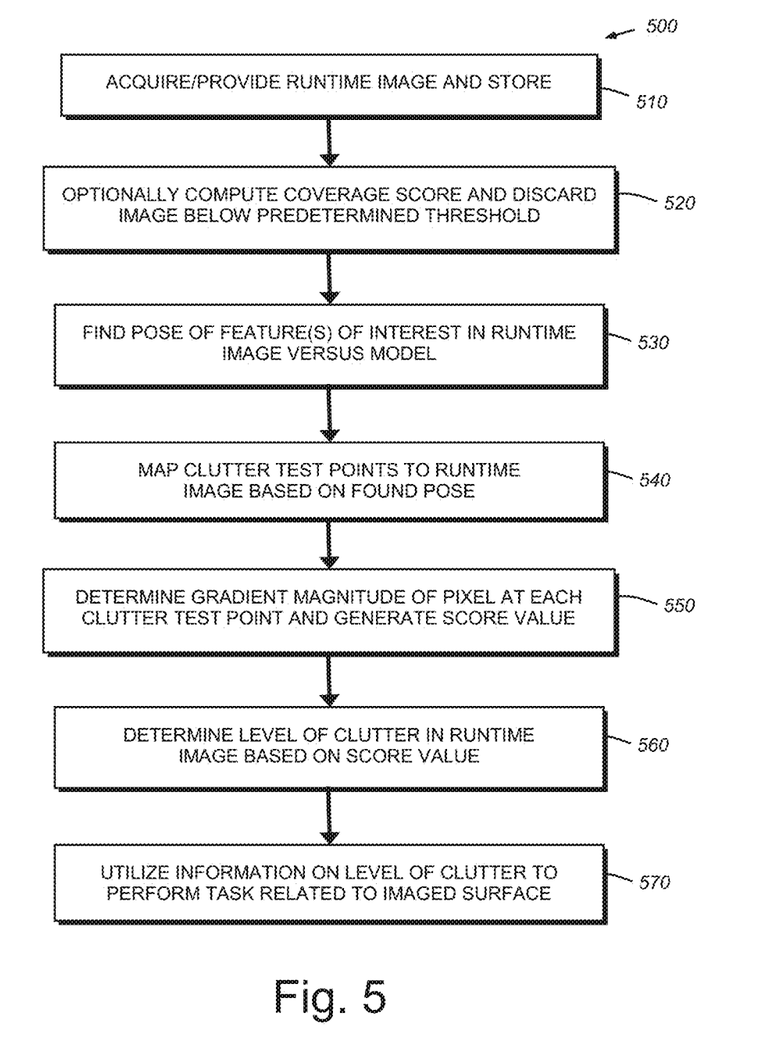
FIG. 5 is a flow diagram of a runtime clutter determination procedure in which clutter test points are mapped to a runtime image and the presence or absence of clutter is determined therefrom.

FIG. 5 shows a runtime procedure 500 in which an acquired image (a candidate image) is to be scored for determination of a level of clutter therein. The image is acquired by the camera assembly 120 (FIG. 1) and stored, or otherwise provided to the system, for runtime analysis at step 510. In step 520, the procedure 500 computes the coverage (raw) score for the image. If raw score is below the "accept" threshold, then the candidate runtime image is discarded and the next image is analyzed—indicating a "reject" status. Note that this step is optional, and can be omitted, and all images can be processed through the procedure 500. Alternatively, step 520 can be provided at a different time in the overall image analysis process/procedure. The computation of coverage and generation of regular image "probes" and other mechanisms for aligning/scoring of images in runtime can be accomplished using commercially available tools and processes described further below (e.g. Cognex PatMax®, RedLine™, etc.). Note also that a runtime mask can be used to avoid scoring any region of the runtime candidate image that has been masked out at runtime as clutter. Note that at least a basic registration process is used to align the coordinate space of the runtime image with the coordinate space of the training pattern. This can establish the runtime image "pose" (step 530).

In step 540, the found "pose" of the runtime image is used to map the clutter test points to the coordinate space of the map the runtime image, nearest neighbor. For each clutter test point, the procedure 500 scores it at step 550 by passing the runtime gradient magnitude through the above-described sigmoid function, and then subtracting the value for ClutterScoreCutoff from the result, clamped at 0. This result is then (by way of non-limiting example) multiplied by (1.0/ (1.0−ClutterScoreCutoff)), which rescales the score space to be normalized (i.e. between 0 and 1). Note that other normalization techniques (or no normalization) can be employed in alternate embodiments. Note that in various embodiments, the sigmoid normalization table can be modified to include the subtraction, clamping, and rescaling directly, making those operations free at runtime.

Figure 6:
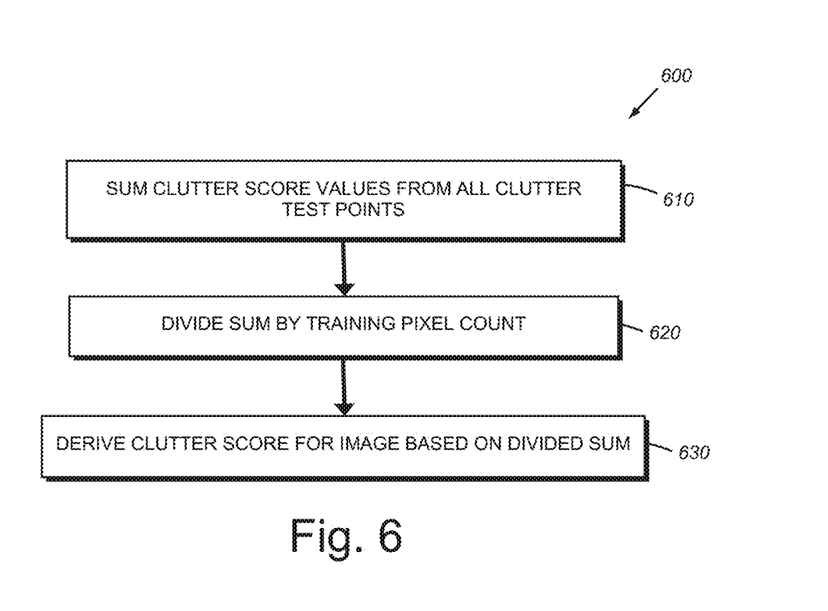
FIG. 6 is a flow diagram of a clutter score determination procedure for use in the runtime clutter determination procedure of FIG. 5.

This computed score information enables the procedure 500 to provide a level of clutter in accordance with step 560. In an embodiment, and with further reference to FIG. 6, the procedure 600 sums all the clutter score values from all of the mapped clutter test points in step 610. This resulting sum is then divided by the stored value TrainingPixelCount in step 620, thereby deriving the overall clutter score (ClutterScore) for the image in step 630. By dividing by the value TrainingPixelCount instead of dividing the value ClutterPixelCount to obtain the resulting rough average value, an assumption is made that a coverage value of 1 would provide as many clutter pixels/locations in the image as there are potential "correct" pixels/locations. The final reported score is (CoverageScore−ClutterFactor*ClutterScore), clamped at 0, where ClutterFactor defaults to 0.5.

In step 570, the clutter score or other information on the level of clutter in the runtime candidate image can be utilized by downstream (optional) processes and tasks to perform various actions, such as (but not limited to) stopping a production line, sounding alerts, storing quality control data, and/or rejecting parts.

In the example of the above-described surface 112 (FIG. 1) with exemplary printing 170 and a smudge 172 that extends beyond the desired printed region, the trained image would include the printed image as feature(s) of interest and the region in which the smudge occurs is considered a "dead space" region for the training image. In the training image/ trained pattern, clutter test points are established in this region based on the expected emptiness. In runtime, the depicted image with smudge results in a gradient magnitude generally above a threshold level, thereby causing generation of a clutter score that is indicative of clutter and defects in the overall image. Thus, the analyzed image of the depicted surface 112 would yield a clutter score sufficient to indicate a defect and a downstream utilization task would take appropriate action to address the result (e.g. part rejection and/or alerts).

Figure 7:
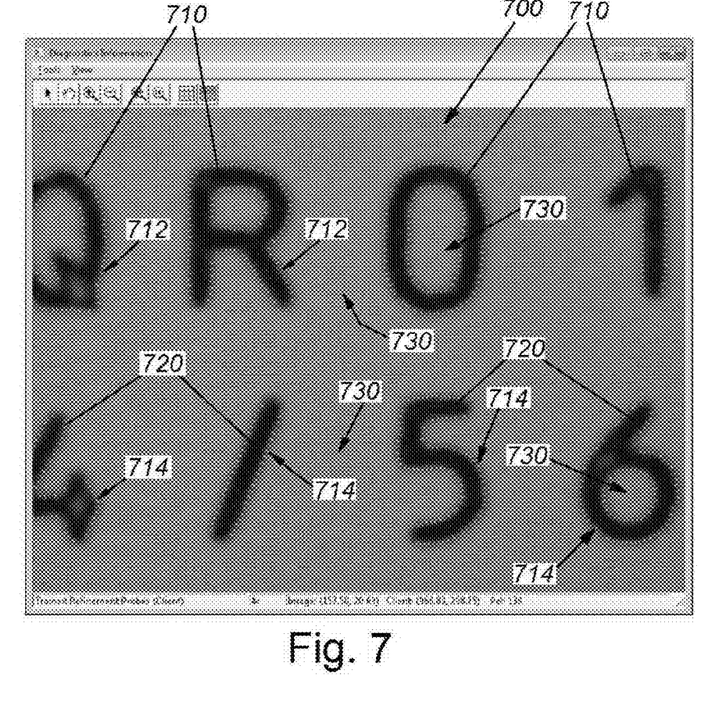
FIG. 7 is a diagram of a display showing a training image/pattern with a series of exemplary letters and numbers, including the generation of regular image feature probes and featureless clutter test points that, respectively, outline the edges of significant features of interest on the training image and empty regions thereon.
Figure 8:
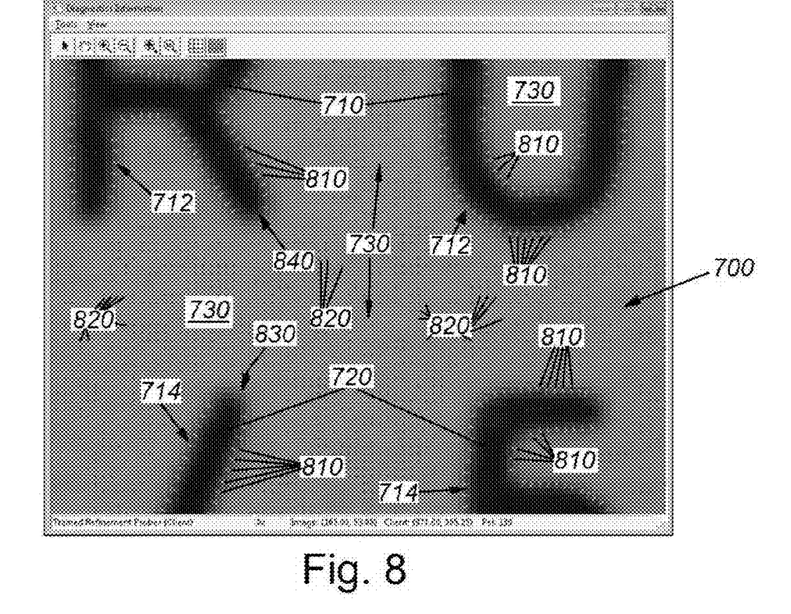
FIG. 8 is a diagram of a display with a close-up on a portion of the image of FIG. 7 showing the presence of probes and clutter test points.

Reference is now made to FIGS. 7-8 that depict a display of a training image (in full and in close-up respectively) 700, in which the features of interest are letters 710 and numbers 720 that respectively define strong edges 712 and 714 having an associated high gradient magnitude. The edges 712, 714 are bounded by areas of emptiness 730. Between these regions are located a series of regular non-clutter image probes 810 that are represented by arrows, to depict the direction of the gradient (shown in greater detail in FIG. 8). These probes essentially surround each edge 712, 714 with direction pointing from the edge toward the emptiness. The spacing between probes 810 is in part a function of a cap on maximum point count. The points are sufficient to adequately bound the strong edges where they meet emptiness. Within the emptiness are a series of clutter test points that are, in essence "interest points" 820 at a set spacing. These points 820 have no direction. Also note in FIG. 8 the existence of regions (e.g. print element ends 830 and 840) that are not significant edges for "features of interest" (bounded by probe arrow points 810) nor "featureless" (arrowless clutter test points 820). These are weak but existing (lower gradient magnitude) edges and are not associated with clutter test points.

Note that use of gradient magnitude to locate features and/or emptiness in an image is one of a variety of techniques that should be clear to those of skill. For example an alternative technique entails performing a Sobel operator analysis on the image and then performing an edge-chaining process, searching for areas with no chains to determine presence/absence of features. Thus, determination of emptiness/empty regions in the image should be taken broadly to include a variety of techniques.

Figure 9:
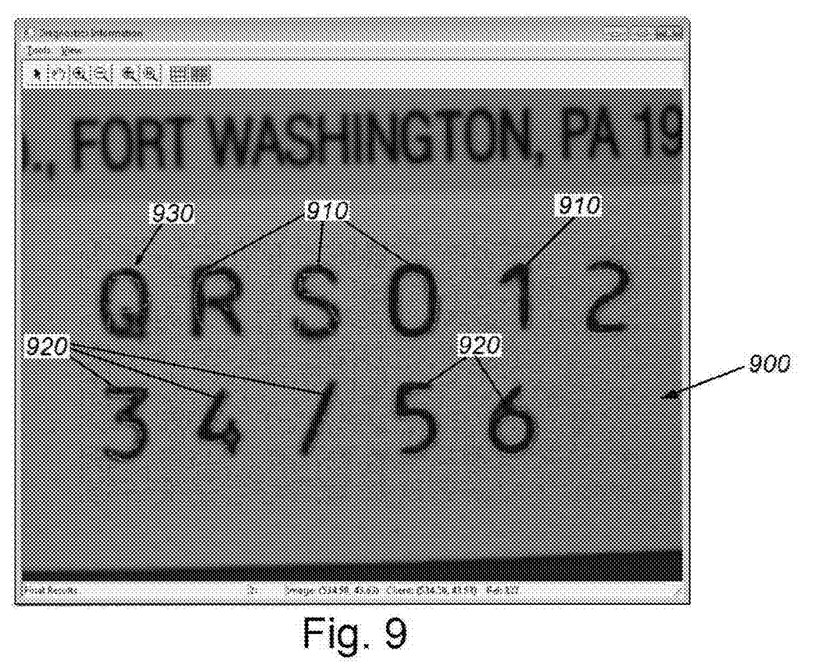
FIG. 9 is a diagram of a display of an acquired runtime candidate image showing alignment of the training pattern probes and clutter test points therewith and the existence of exemplary, conflicting features (letters) between the training pattern and features of the runtime candidate image.
Figure 10:
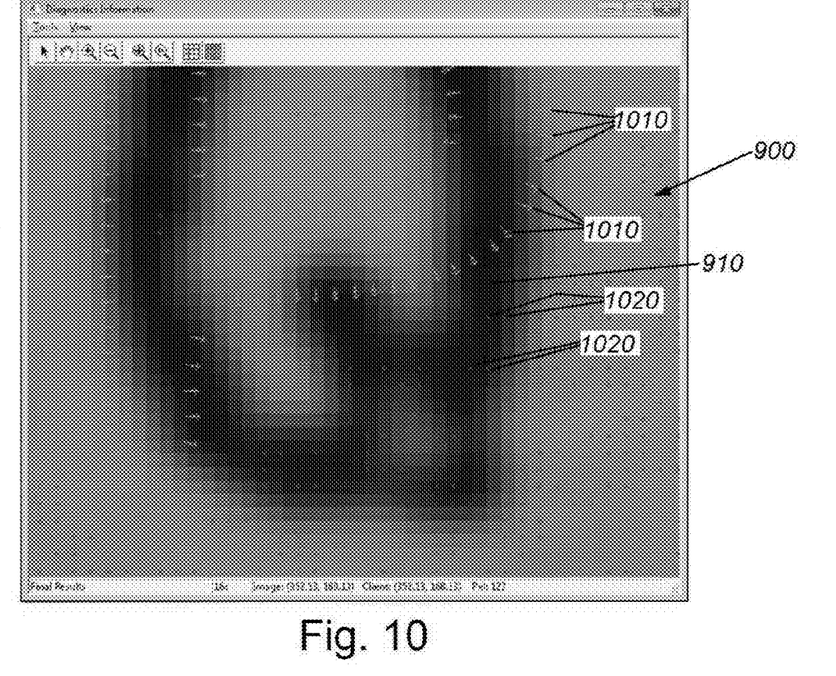
FIG. 10 is a diagram of a display with a close-up on a portion of the image of FIG. 7 showing differences between a feature (letter) on the acquired pattern versus the feature probes and clutter test points of the training pattern.

With reference now to FIGS. 9 and 10, the display depicts a runtime candidate image 900 acquired by the camera assembly 120 (FIG. 1). The probes and clutter test points are overlaid onto the candidate image 900 and there is a sufficient match—e.g. printed numbers 0, 1 and 2 on top and 3, 4, /5 and 6 on the bottom to provide an alignment and mapping between the training pattern (which is defined by the probes) and the features/edges of the candidate image 900. However, the letters Q, R and S on the acquired candidate image 900 do not match the trained pattern probes, which, respectively are P, Q and R. Referring particularly to the close-up of FIG. 10, the acquired candidate letter Q 910 does not match the probes 1010, which outline a letter P and in which some of the clutter test points 1020 reside within the printed feature showing significant gradient magnitude where little or none should exist. Thus, on sampling the probes 1010 and clutter test points 1020, the gradient magnitudes will not match expected values and will be considered clutter. Thus, the candidate image will have a high clutter score and be rejected. In this instance, the presence of high clutter actually serves as an alignment and pattern recognition tool, as well as a pure defect-detection tool. However, the result would be similar if all printed letter in the runtime candidate image matched the points in the trained pattern, but additional smudges or extraneous printing were present. Such smudges or printing would show a gradient magnitudes where low/no-gradient emptiness should exist. Note that it is possible to omit regular probes in the analysis of a runtime image, and rely only upon clutter test points to determine an acceptable (passing) match between a training and runtime pattern. Where clutter test points overlie areas of high gradient magnitude (based on presence of a pattern element, representing clutter where emptiness should exist—i.e. a high clutter score), the images do not match.

It should be clear that the generation of a clutter test point training pattern allows for rapid and reliable detection of unwanted features on a runtime candidate image. This approach allows for acceptance or rejection of candidates before more in depth and processor/time-intensive analysis is undertaken, thereby increasing operational efficiency and throughput speed.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A method for determining clutter in an imaged scene with a vision system comprising the steps of:
   providing a runtime image of a scene;
   providing a trained pattern with a set of clutter test points based upon sub-pixel locations that represent a level of emptiness in the trained pattern;
   establishing a runtime pose with a coordinate space for the image with respect to the trained pattern;
   mapping the clutter test points on the coordinate space for the image;
   determining a level of emptiness respectively at the mapped clutter test points; and
   based upon the level of emptiness, determining a level of clutter in at least a portion of the image.

2. The method as set forth in claim 1 wherein the step of determining the level of emptiness comprises generating respective clutter score values for the mapped clutter test points.

3. The method as set forth in claim 2 further comprising summing the clutter score values and generating an overall clutter score value for at least the portion of the image.

4. The method as set forth in claim 1 wherein the step of determining the level of emptiness comprises determining a gradient magnitude respectively at the mapped clutter test points and comparing the magnitude to a predetermined threshold.

5. The method as set forth in claim 1 wherein the step of establishing the pose comprises at least one of (a) employing alignment tools in a vision system to automatically align the runtime image to the trained pattern and (b) obtaining information indicating the pose from a user input.

6. A method for extracting a training pattern for determining a level of clutter in at least a portion of an imaged scene with a vision system comprising the steps of:
   providing a training image with a feature of interest;
   providing a predetermined clutter threshold value relative to a level of emptiness that indicates clutter-free regions in the image; and
   establishing clutter test points based upon sub-pixel locations with respect to a coordinate space of the training image based upon locations in the coordinate space that represent the level of emptiness that is free-of clutter.

7. The method as set forth in claim 6 wherein the training image includes a mask that indicates which areas of the training image should be evaluated for emptiness.

8. The method as set forth in claim 6 where the training image includes features specified by description free of reliance on pixel values.

9. The method as set forth in claim 6 wherein the step of establishing the clutter test points includes determining a gradient magnitude in regions of the training image less than a predetermined threshold value.

10. The method as set forth in claim 6 further comprising storing the clutter test points in the coordinate space of the trained image for use in clutter determination in a runtime image.

11. The method as set forth in claim 6 wherein the clutter threshold value is computed based upon a histogram of gradient values within the training image.

12. The method as set forth in claim 6 wherein the clutter threshold is provided as an input parameter.

13. A system for determining a level of clutter in a runtime candidate image based on a trained pattern using a vision system comprising:
   a training time clutter point generator that generates an array of clutter test points based upon sub-pixel locations relative to a coordinate space in a training image having information based upon locations in the training image that have a level of emptiness below a clutter threshold, the clutter threshold being established based upon predetermined parameters and the information in the training image; and
   a runtime clutter determiner that maps the locations of the clutter test points to the runtime candidate image based upon a runtime pose, and that computes a level of emptiness at each of the locations to determine the level of clutter in at least a portion of the acquired image.

14. The system as set forth in claim 13 wherein the level of emptiness in the runtime candidate image is based upon a determined gradient magnitude at the locations, respectively.

15. The system as set forth in claim 13 further comprising a clutter utilizer that utilizes determined clutter level to perform a predetermined action with respect to a surface associated with the runtime candidate image based upon the determined level of the clutter.

16. The system as set forth in claim 15 wherein the predetermined action includes at least one of part reject, issuing an alert, transmitting quality data and stopping a moving line.

17. The system as set forth in claim 13 wherein at least one of the predetermined parameters is input by a user.

18. The system as set forth in claim 13 wherein the clutter determiner creates a clutter score at each of the locations.

19. The system as set forth in claim 18 wherein the clutter determiner sums the clutter score for each of the locations to generate an overall clutter score for the runtime candidate image.

20. The system as set forth in claim 13 wherein the information includes a feature of interest and further comprising an alignment tool that determines the runtime pose based upon a location of at least a portion of the feature of interest in each of the training image and the runtime candidate image.

* * * * *